J. H. THOMAS.
Horse Hay-Rakes.

No. 196,501.  Patented Oct. 23, 1877.

Witnesses:
Alex Mahon
John G. Center

Inventor
John H. Thomas
by A. M. Smith
Attorney

UNITED STATES PATENT OFFICE.

JOHN H. THOMAS, OF SPRINGFIELD, OHIO.

IMPROVEMENT IN HORSE HAY-RAKES.

Specification forming part of Letters Patent No. 196,501, dated October 23, 1877; application filed August 7, 1875.

*To all whom it may concern:*

Be it known that I, JOHN H. THOMAS, of Springfield, county of Clarke, State of Ohio, have invented a new and useful Improvement in Hay-Rakes, of which the following is a full, clear, and exact description, reference being had to the accompanying drawing, making part of this specification, in which—

Figure 1:
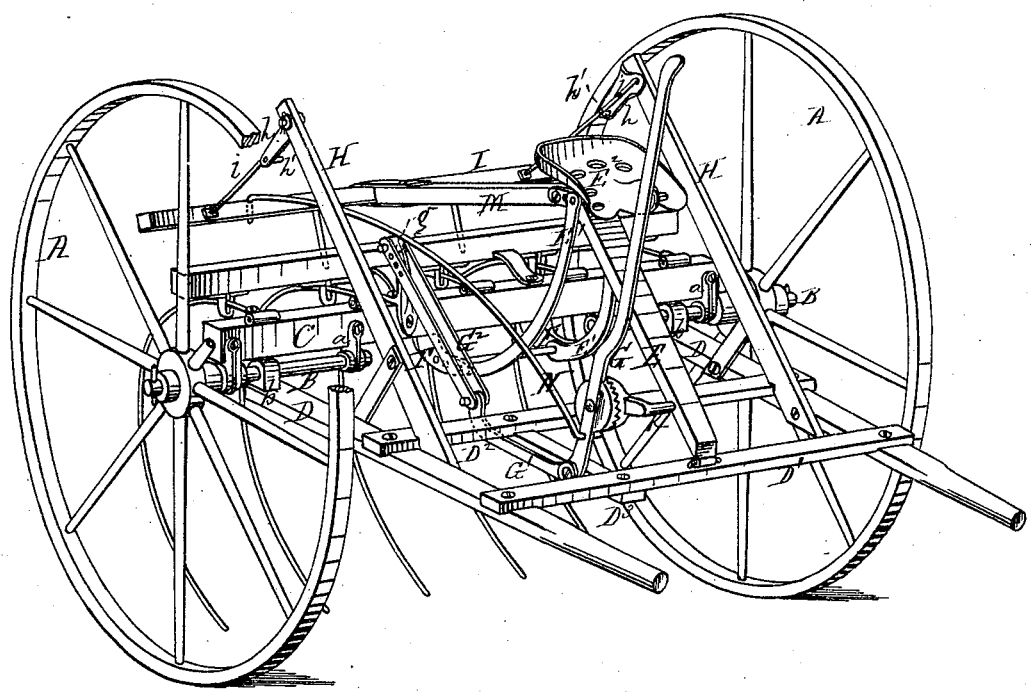
Figure 2:
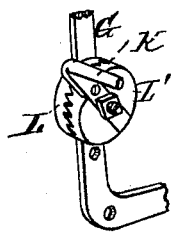

Figure 1 represents a perspective view of a horse-rake, showing my improvements applied; and Fig. 2, a perspective view of the adjustable treadle, with a section of the hand-lever, to which it is applied, detached.

My invention consists, first, in the combining the foot-lever or treadle by means of which the rake-teeth are held down to their work with the hand-lever by which the operations of the rake are controlled, through the medium of adjusting disks or rose-plates, whereby the position or distance of the treadle from the driver's seat can be varied to suit the attendant, as hereinafter described; and, second, in a novel arrangement of the connecting-rod between the pendent clearer-head and the lever controlling the rake-teeth, whereby the clearer-head is held out of actual contact with the rake-teeth when the latter are raised, as hereinafter described.

In the accompanying drawings, A A represent the carrying-wheels, mounted and turning on short axles B B, which have their bearings in pendent boxes or brackets $a\ a'$ secured to the rake-head C. The axles B are further secured in upright blocks or ears $b$, rigidly attached to the rear end of the draft-frame or thills D D, at points intermediate between the brackets $a\ a'$, the connection between the parts being such as to allow the rake-head C to rock or rotate on the axle B B as a center. The thills D D, in front of the axle, are united by suitable transverse bars $D^1\ D^2$, and these, in turn, are united by a longitudinal bar, $D^3$, these parts together forming the draft-frame.

The forward transverse bar $D^1$ has hinged to it the forward lower end of a seat-bar or standard, E, the rear upper end of which is connected by pendent pivoted rod or links $E^1$ with forwardly-projecting lever-arms F rigidly connected with the rake-head, said arm being provided, at varying distances from the rake-head, with a number of perforations, which permit the adjustment of the leverage on the rake-head to suit the weight of the operator in the seat $E^2$, which is connected to the upper end of standard E.

The longitudinal bar $D^3$ has an elbow-lever, G, pivoted to it, the forward upright arm of which extends up into convenient position to be operated by the driver on the seat $E^2$. The rear horizontal arm $G^1$ of this lever is connected by a link, $G^2$, with an upright arm or lever, $g$, attached to the rake-head, the arrangement being such that, as the lever G is moved backward, depressing arm $G^1$, a forward rotation or rocking movement is given to the rake-head, raising the rake-teeth, a reverse movement of the lever being required for depressing the teeth to their work. To the draft-frame or thills D D oblique standards H H are secured, the rear upper ends of which, overhanging the rake-head, are provided with brackets or arms $h\ h$, which project downward and toward the rear of the machine, at about right angles to the oblique standards H. The brackets or arms $h$, at their lower ends, are provided with inwardly-projecting spurs $h'$, and at or near their upper ends have pendent rods $i\ i$ pivoted to them, to the lower swinging ends of which the clearer rod or head I is secured.

When the rake-teeth are operating to gather a load, the rods or links $i$ rest upon the spurs $h$, and support the clearer-head above and sufficiently removed from the rake-teeth to withdraw the clearer-teeth; but when the rake-teeth are raised, the clearer-teeth enter between the rake-teeth and assist in the operation of discharging the load.

Thus far the rake, in its construction and arrangement of parts, is substantially the same as has been described in a former application, and, in addition to the foregoing, a foot-piece or treadle was applied to the hand-lever to enable the driver, with his foot, to overcome the tendency of the weight of the driver in his seat to raise the rake-teeth, under the arrangement of parts described.

For the purpose of giving increased efficiency to this treadle or foot-piece, and for adapting it to the length of the operator's legs, it is made adjustable. The means shown for this purpose consist of two rose-plates, L L', one of which, L, has a groove or socket matching the lever G, and the other a groove for the reception of, or made in one piece with, the foot-piece or treadle K. A through-bolt and nut at *l* secures the several parts firmly together, and by simply loosening the bolt and turning the plate L' relatively to the plate L the treadle K may be set nearer to or farther from the seat, as required, without changing the distance of the point of attachment of the treadle from the fulcrum of said lever.

For the purpose of reducing the size of the rose-plates or disks, that to which the treadle K is secured may have a groove cut in its outer face, and the treadle may be secured to a perforated bar sliding in said groove, thus making the treadle adjustable back and forth on the disk, the through-bolt serving to hold it at any desired point of adjustment.

The same result as above described may be attained by using the foot-piece just described, made adjustable on its supporting-disk, without the aid of the second disk, by providing said single disk, near its periphery, with a circle of perforations, and by passing a bolt or pin through any desired one of said perforations, and through a hole in the lever for holding the disk and treadle at the required adjustment.

In the former application referred to, the clearer rod or head was prevented from coming in contact with the rake-teeth, when the latter were raised, by a pivoted rod or link at M connecting it with the pivoted seat-standard, the backward movement of which, in raising the teeth, served to thrust the clearer-head I backward and upward, swinging it upon its suspending-rods *i i*. This is accomplished, in the present instance, by connecting the clearer-head with the hand-lever G, by a rod or link, N, in such manner that, as the backward movement referred to is given to the lever for raising the rake-teeth, such movement is imparted to the clearer-head, swinging it backward and upward, and thereby keeping it out of frictional contact with the rake-teeth, and giving a backward clearing-thrust to the clearer-teeth.

The extent of throw of the clearer-head will be governed by the distance of the point of attachment between the link N and lever G from the fulcrum-pivot of said lever, and may be varied, if desired, by providing the lever with a number of perforations, in any one of which the forward end of the rod N may be secured.

Parts of the rake not particularly described may be constructed in any usual or preferred manner.

Having now described my invention, what I claim as new, and desire to secure by Letters Patent, is—

1. The treadle or foot-piece K, united to the hand-lever G by means of the adjusting-disks or rose-plates and the through-bolt, arranged and operating as and for the purpose described.

2. The vibrating pendent clearer-head, connected with the pivoted seat-support by the link M, in combination with the rod or link N, connecting it directly with the rake-controlling lever, as described.

In testimony whereof I have hereunto set my hand this 27th day of July, A. D. 1875.

JOHN H. THOMAS.

Witnesses:
R. P. THOMAS,
WILL S. THOMAS.